US009365278B2

(12) United States Patent
Blanton et al.

(10) Patent No.: US 9,365,278 B2
(45) Date of Patent: Jun. 14, 2016

(54) VARIATION COMPENSATING ASSEMBLY

(71) Applicant: The Boeing Company, Chicago, IL (US)

(72) Inventors: Ross Mitchell Blanton, Hazelwood, MO (US); Tracy L. Bagwill, Wildwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 451 days.

(21) Appl. No.: 13/746,053

(22) Filed: Jan. 21, 2013

(65) Prior Publication Data
US 2014/0203145 A1 Jul. 24, 2014

(51) Int. Cl.
*B64D 27/26* (2006.01)
*B64C 1/00* (2006.01)
*F16B 5/02* (2006.01)

(52) U.S. Cl.
CPC .............. *B64C 1/00* (2013.01); *F16B 5/0225* (2013.01); *Y10T 16/05* (2015.01); *Y10T 403/55* (2015.01)

(58) Field of Classification Search
CPC .......... F16C 11/02; F16C 11/04; F16C 11/06; F16C 11/0614; Y10T 403/32861; Y10T 403/32868; Y10T 403/32877; Y10T 403/32918; Y10T 403/32926; B60G 7/02; B62D 17/00; B64D 27/26
See application file for complete search history.

(56) References Cited

U.S. PATENT DOCUMENTS

| 3,381,554 | A | | 5/1968 | Ploch et al. | |
|---|---|---|---|---|---|
| 5,303,880 | A | * | 4/1994 | Cencula | B64D 27/26 244/54 |
| 5,649,417 | A | * | 7/1997 | Hey | B64D 27/26 244/54 |
| 5,860,623 | A | * | 1/1999 | Dunstan | B64D 27/18 244/54 |
| 6,330,995 | B1 | * | 12/2001 | Mangeiga | B64D 27/26 244/54 |
| 7,445,399 | B2 | * | 11/2008 | Dunn | F16C 11/0614 403/119 |
| 7,578,044 | B2 | | 8/2009 | Clark | |

FOREIGN PATENT DOCUMENTS

| AU | 496094 B2 | 12/1976 |
|---|---|---|
| CN | 201613517 U | 10/2010 |
| FR | 2554522 A1 | 5/1985 |
| GB | 478369 A | 1/1938 |
| WO | 2010033149 A2 | 3/2010 |

OTHER PUBLICATIONS

International Search Report and Written Opinion, dated Apr. 10, 2014, regarding Application No. PCT/US2013/075920, 11 pages.
International Search Report and Written Opinion, dated Jul. 21, 2015, regarding Application No. PCT/US2013/075920, 7 pages.

* cited by examiner

*Primary Examiner* — Daniel Wiley
(74) *Attorney, Agent, or Firm* — Yee & Associates, P.C.

(57) ABSTRACT

An apparatus comprising an outer sleeve and an inner sleeve. The outer sleeve has a first channel with an inner wall with a first number of substantially planar surfaces. The inner sleeve has a second channel and an outer wall with a second number of substantially planar surfaces. The outer wall is configured to be received within the first channel. At least one of the second number of substantially planar surfaces on the outer wall of the inner sleeve is configured to slide against at least one of the first number of substantially planar surfaces.

18 Claims, 14 Drawing Sheets

VARIATION COMPENSATING ASSEMBLY

BACKGROUND INFORMATION

1. Field

The present disclosure relates generally to assembly of parts, particularly assembly of parts with holes. Still more particularly, the present disclosure relates to assemblies for compensating for variation in the placement of holes in parts in the assembly of parts.

2. Background

During assembly, parts may be attached by placing elongate structures, such as bolts or pins, through holes in the parts. Anticipated manufacturing variation in the location of the holes of each part necessitates clearances between the elongate structures and the holes in the parts. If the clearances are not sufficient to accommodate the manufacturing variation, an elongate structure may not be able to be inserted through both parts. Further, if the clearances are not sufficient to accommodate the manufacturing variation, deformation of the elongate structures and the parts may be required to insert elongate structures.

One solution is to locate the holes in one part from the holes in the other part. This technique may be known as "match drilling." Another solution is to drill a slotted hole in one of the parts or use a slotted bushing rather than a circular hole. Yet another solution is to use an elongate structure having only a partial full diameter. Such an elongate structure may be referred to as a "diamond pin."

However, these solutions may be undesirable for use in manufacturing. For example, the parts still may not mate properly and may require rework or scrap. Further, these solutions may require additional time or additional elements. Still further, these solutions may increase the cost or weight of the system undesirably.

Therefore, it would be desirable to have a method and apparatus that takes into account at least some of the issues discussed above, as well as other possible issues.

SUMMARY

In one illustrative embodiment, an apparatus is presented. The apparatus comprises an outer sleeve and an inner sleeve. The outer sleeve has a first channel with an inner wall with a first number of substantially planar surfaces. The inner sleeve has a second channel and an outer wall with a second number of substantially planar surfaces. The outer wall is configured to be received within the first channel. At least one of the second number of substantially planar surfaces on the outer wall of the inner sleeve is configured to slide against at least one of the first number of substantially planar surfaces.

In another illustrative embodiment, a system comprises a first part, a second part, an elongate structure connecting the first part and the second part, and an apparatus positioned in one of the first part and the second part. The elongate structure is inserted through the apparatus. The apparatus comprises an outer sleeve and an inner sleeve. The outer sleeve has a first channel with an inner wall with a first number of substantially planar surfaces. The inner sleeve has a second channel and an outer wall with a second number of substantially planar surfaces. The outer wall is configured to be received within the first channel. At least one of the second number of substantially planar surfaces on the outer wall of the inner sleeve is configured to slide against at least one of the first number of substantially planar surfaces.

In yet another illustrative embodiment, a method is provided. An aircraft is operated. A stress is transferred from an elongate structure to a first part during operation of the aircraft with an apparatus comprising an outer sleeve and an inner sleeve. The outer sleeve has a first channel with an inner wall with a first number of substantially planar surfaces. The inner sleeve has a second channel and an outer wall with a second number of substantially planar surfaces. The outer wall is configured to be received within the first channel. At least one of the second number of substantially planar surfaces on the outer wall of the inner sleeve is configured to slide against at least one of the first number of substantially planar surfaces.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that "match drilling" may be inefficient or undesirable in assembling parts. For example, "match drilling" is performed on a part by part basis. Accordingly, "match drilling" is inconsistent with interchangeability which may be desirable in manufacturing. Further, "match drilling" may require more time and resources than drilling parts prior to assembly.

The illustrative embodiments recognize and take into account that to keep the price of parts low an assembling party must allow manufacturing variation in the detail parts. As a result, the assembling party may not control the placement of holes or the variation in the placement of holes to the precision required for immediate assembly.

The illustrative embodiments recognize and take into account that as clearances between elongate structures and holes are increased, the amount of shear force that the resulting joint can withstand is decreased. As a result, accommodating manufacturing variation by changing clearances can limit the amount of shearing force transferred between two parts. As a result, the amount of shearing force transferred between two parts may require additional material at the joint.

The illustrative embodiments recognize and take into account that currently available solutions may not be able to transfer force at a desired level. For example, in slotted holes, when an elongate structure is inserted, a theoretical line contact is formed. This theoretical line contact is formed by a cylindrical surface contacting a planar surface. The theoretical line contact is the load path to transfer forces from the elongate structure to the slotted hole. A theoretical line contact is not an effective means to transfer high forces.

As another example, "diamond pins" may result in a small contact area between a "diamond pin" and the holes. Like a theoretical line contact, a small contact area may not be an effective means to transfer high forces.

The illustrative embodiments recognize and take into account that compensating for variations may produce a cost savings. For example, compensating for variations may enable the creation of simpler assembly designs. Simpler assembly designs may require less manufacturing touch time which may produce a cost savings as well as a weight savings. Further, compensation for variations may result in cost savings by not having to scrap or rework parts that do not fit.

Figure 1:
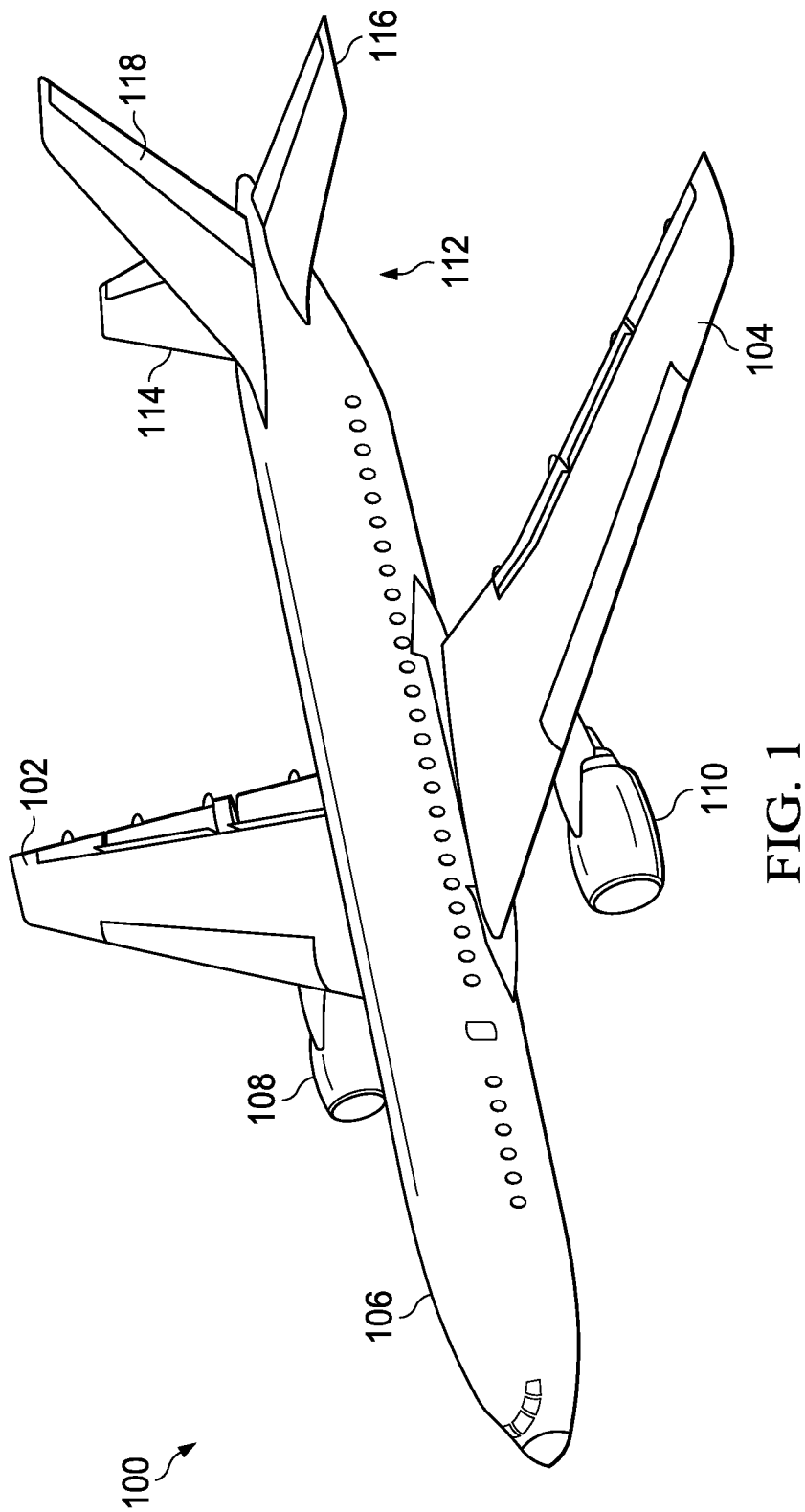
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which tolerance compensating assembly may be implemented in accordance with an illustrative embodiment. For example, tolerance compensating assembly may be used in connecting a payload structure to a payload. The payload structure may be attached to wing 102, wing 104, body 106, a wheel, or other suitable portion of aircraft 100. Further, tolerance compensating assembly may be used to connect parts in the manufacture of portions of the aircraft such as wing 102 and wing 104.

Figure 2:
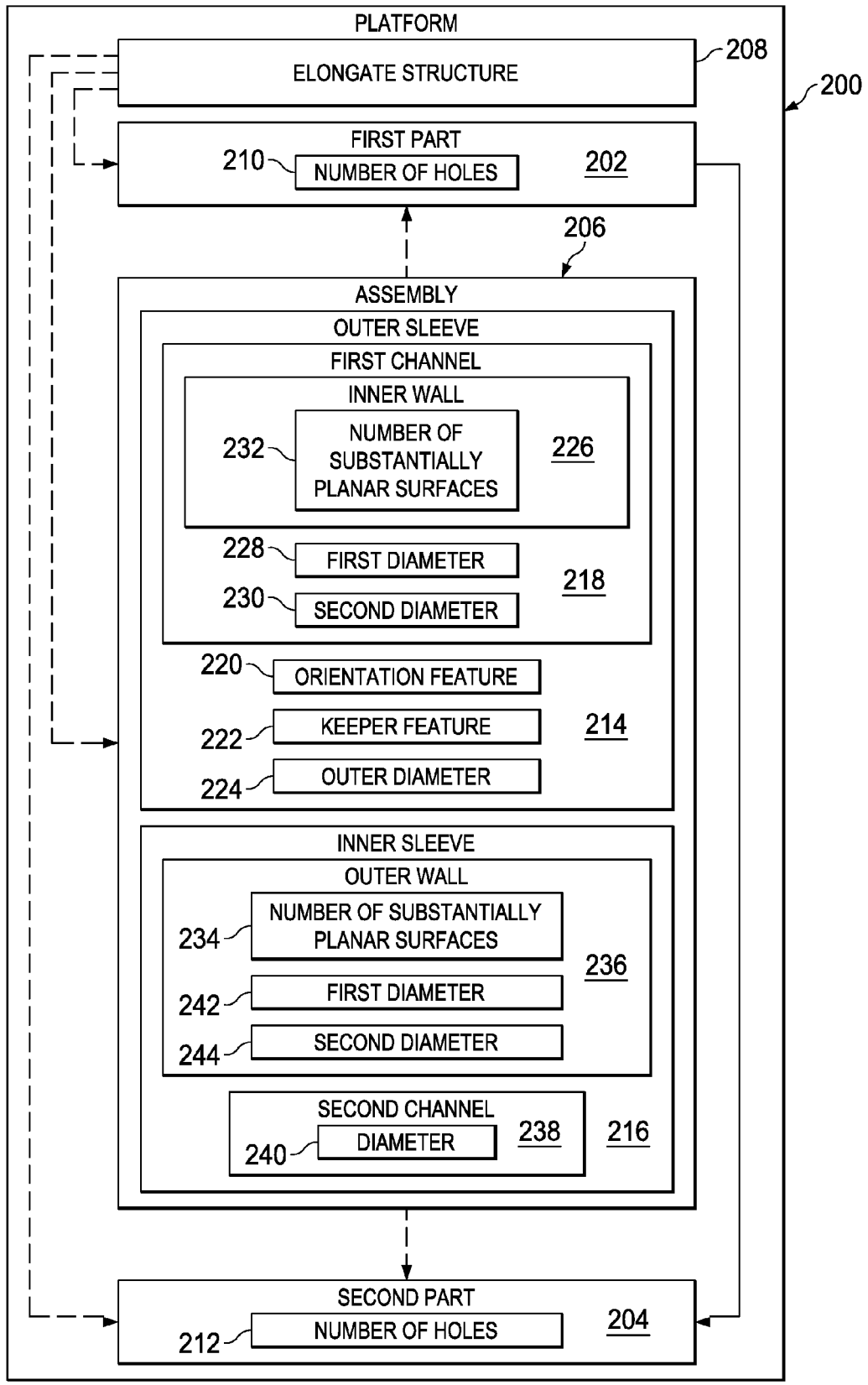
FIG. 2 is an illustration of a block diagram of a platform in accordance with an illustrative embodiment.

With reference now to FIG. 2, an illustration of a block diagram of a platform is depicted in accordance with an illustrative embodiment. In FIG. 2, platform 200 may be one implementation of aircraft 100. Although the illustrative examples for an illustrative embodiment are described with respect to an aircraft, an illustrative embodiment may be applied to other types of platforms. Platform 200 may be, for example, without limitation, a mobile platform, a stationary platform, a land-based structure, an aquatic-based structure, and a space-based structure. More specifically, platform 200 may be a surface ship, a tank, a personnel carrier, a train, a spacecraft, a space station, a satellite, a submarine, an automobile, a power plant, a bridge, a dam, a house, a manufacturing facility, a building, and other suitable platforms.

As depicted, platform 200 has first part 202, second part 204, assembly 206, and elongate structure 208. First part 202 has number of holes 210. Second part 204 has number of holes 212. As used herein, a "number of" items means one or more items. For example, number of holes 210 means one or more holes.

As used herein, a hole is a channel in a part regardless of shape. The shape of a hole may be selected from at least one of circular, rectangular, elliptical, triangular, a slot, or any other suitable hole. In some illustrative examples, a hole may go through a part or through a portion of the part.

First part 202 and second part 204 may be connected using elongate structure 208, number of holes 210, and number of holes 212. For example, elongate structure 208 may be inserted through at least one hole of number of holes 210 of first part 202 and at least one hole of number of holes 212 of second part 204. In one illustrative example, elongate structure 208 may be inserted through one hole of number of holes 210 of first part 202 and one hole of number of holes 212 of second part 204. In another illustrative example, elongate structure 208 may be inserted through one hole of number of holes 210 of first part 202 and two holes of number of holes 212 of second part 204. In yet another illustrative example, elongate structure 208 may be inserted through two holes of number of holes 210 of first part 202 and one hole of number of holes 212 of second part 204.

In these illustrative examples, elongate structure 208 is configured to join first part 202 and second part 204. In one or more illustrative examples, elongate structure 208 may be configured to hold first part 202 and second part 204 relative to each other in one or more positions. Elongate structure 208 may be selected from one of a fastener, a screw, a bolt, a pin, and any other suitable structure that may be used with first part 202 and second part 204.

Assembly 206 is configured to compensate for a variation in the placement of at least one hole in number of holes 210 and number of holes 212. Assembly 206 may be manufactured in a variety of sizes. Considerations may be used to determine a desirable size for assembly 206. Considerations may include at least one of the size of first part 202, the size of second part 204, the size of elongate structure 208, degree of force, anticipated degree of variation, or other suitable considerations. The diameter of the assembly may range from several nanometers to several feet. In one illustrative embodiment, assembly 206 may have a diameter between 1.5 and 2 inches.

As depicted, assembly 206 has outer sleeve 214 and inner sleeve 216. Outer sleeve 214 and inner sleeve 216 may be made of any appropriate material. Materials may be selected from at least one of metals, composites, plastics, ceramics and any other suitable material. Outer sleeve 214 and inner sleeve 216 of assembly 206 may be made from the same material or from different materials. In some illustrative examples, outer sleeve 214 and inner sleeve 216 of assembly 206 may be manufactured from materials configured to resist deformation under high loads and to transfer high loads. In one illustrative example, at least one of outer sleeve 214 and inner sleeve 216 is manufactured from a material selected from the group of machineable metals. In another illustrative example, at least one of outer sleeve 214 and inner sleeve 216 is made of hardened steel.

As depicted, outer sleeve 214 has first channel 218, orientation feature 220, keeper feature 222, and outer diameter 224. First channel 218 is configured to accept portions of inner sleeve 216. In one illustrative example, first channel 218 is configured to accept all of inner sleeve 216.

First channel 218 has inner wall 226, first diameter 228, and second diameter 230. Inner wall 226 has number of substantially planar surfaces 232. In one illustrative example, first channel 218 is similar to an ellipse having two substantially circular sides and number of substantially planar surfaces 232 wherein number of substantially planar surfaces 232 is two substantially planar surfaces.

First diameter 228 is configured to accept portions of inner sleeve 216. In one illustrative example, first diameter 228 is the distance between number of substantially planar surfaces 232.

Second diameter 230 is configured to allow movement of inner sleeve 216 within outer sleeve 214. In the above illustrative example, second diameter 230 may be the distance between the two substantially circular sides.

Number of substantially planar surfaces 232 is configured so that at least one of number of substantially planar surfaces 232 may slideably engage at least one of number of substantially planar surfaces 234 of outer wall 236 of inner sleeve 216. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Orientation feature 220 is configured to orient outer sleeve 214 in relation to a structure such as one of first part 202 and second part 204. In one illustrative example, orientation feature 220 is a groove machined into outer sleeve 214. In this illustrative example, a fastener head may contact orientation feature 220. Specifically, a portion of a fastener head may sit within the groove and prevent outer sleeve 214 from rotating relative to one of first part 202 and second part 204.

In another illustrative example, orientation feature 220 is a hole configured to accept a fastener, such as a screw, bolt, pin, or other suitable fastener. A fastener may be placed into the hole and one of first part 202 and second part 204. In this way, orientation feature 220 prevents outer sleeve 214 from rotating relative to one of first part 202 and second part 204. In this illustrative example, orientation feature 220 may also be referred to as a securing feature. In this illustrative example orientation feature 220 is configured to secure outer sleeve 214 to a structure such as one of first part 202 and second part 204.

In yet another illustrative example, orientation feature 220 is a groove machined into the outer wall of outer sleeve 214. A second groove may be machined into one of first part 202 and second part 204. The assembly 206 may be placed in a hole in one of first part 202 and second part 204, so that the groove in outer sleeve 214 and the second groove in one of first part 202 and second part 204 are adjacent. When adjacent, the groove in outer sleeve 214 and the second groove in one of first part 202 and second part 204 may form a channel which is configured to accept a pin. A pin may then be placed within the channel to prohibit rotation of outer sleeve 214. In this way, orientation feature 220 prevents outer sleeve 214 from rotating relative to one of first part 202 and second part 204.

Keeper feature 222 is configured to retain inner sleeve 216 within outer sleeve 214 in one axis. Keeper feature 222 may prevent removal of inner sleeve 216 from outer sleeve 214 along one direction of this axis. In one illustrative example, keeper feature 222 may be a lip configured to retain inner sleeve 216 within outer sleeve 214. Keeper feature 222 may be desirable for ease of assembly, maintenance, and other operations.

Outer diameter 224 is configured to sit within a hole of one of first part 202 and second part 204. In one illustrative example, outer diameter 224 is configured to be a transition fit in a hole of one of first part 202 and second part 204. As used herein, a transition fit is a mechanical fit in which a clearance or interference fit may be obtained within the specified tolerance. In another illustrative example, outer diameter 224 is configured to be a clearance fit in a hole of one of first part 202 and second part 204. In yet another illustrative example, outer diameter 224 is configured to be an interference fit in a hole of one of first part 202 and second part 204. In another illustrative example, the hole of one of first part 202 and second part 204 is a counterbore connected to a hole in number of holes 210 of first part 202 or number of holes 212 of second part 204.

Inner sleeve 216 has outer wall 236 and second channel 238. Second channel 238 is configured to receive elongate structure 208. Second channel 238 has diameter 240. In one illustrative example, diameter 240 of second channel 238 is configured to be a transition fit into elongate structure 208. As a result, in this illustrative example, elongate structure 208 may transfer high forces to inner sleeve 216.

Outer wall 236 is configured to fit within outer sleeve 214. In one illustrative example, outer wall 236 is configured to slideably engage outer sleeve 214.

Outer wall 236 has number of substantially planar surfaces 234, first diameter 242, and second diameter 244. Number of substantially planar surfaces 234 is configured to engage outer sleeve 214. In one illustrative example, number of substantially planar surfaces 234 comprises two substantially planar surfaces configured to slideably engage outer sleeve 214.

First diameter 242 is configured to fit within first channel 218 of outer sleeve 214. In one illustrative example, first diameter 242 is the distance between number of substantially planar surfaces 234. In this illustrative example, first diameter 242 is configured to allow number of substantially planar surfaces 234 to slideably engage number of substantially planar surfaces 232 of outer sleeve 214.

Second diameter 244 of outer wall 236 is configured to fit within first channel 218 of outer sleeve 214. Second diameter 244 may be configured to be smaller than second diameter 230 of outer sleeve 214. In one illustrative example, second diameter 244 is configured to allow inner sleeve 216 to slide within outer sleeve 214.

The illustrative examples may be used to compensate for variations in the position of holes in parts. For example, a hole in number of holes 210 of first part 202 may be farther to the right than designed. As a result, the hole in number of holes 210 may not align with a hole in number of holes 212 as desired. To compensate for the variation in the position of the hole in number of holes 210, inner sleeve 216 may move relative to outer sleeve 214 in assembly 206.

By compensating for variations in the position of holes in parts, the illustrative embodiments may produce a cost savings. For example, compensating for variations may enable the creation of simpler assembly designs. Simpler assembly designs may incorporate fewer components, which may produce a cost savings as well as a weight savings. Further, compensation for variations may result in cost savings by not having to scrap or rework parts that do not fit.

One or more illustrative embodiments may allow for high forces to be transferred from an elongate structure to an assembly. Further, the illustrative embodiments may be used in any type of part.

The illustrative embodiments may require less time or resources than "mate drilling." Further, the illustrative embodiments may be used in parts of different sizes, shapes, and designs. This interchangeability may produce a cost savings.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, outer sleeve 214 may not have keeper feature 222. In this illustrative example, inner sleeve 216 may have a keeper feature, such as a lip. In another illustrative example, outer sleeve 214 may have keeper feature 222 and inner sleeve 216 may have a second keeper feature configured to function in combination with keeper feature 222. In this illustrative example, keeper feature 222 may be a counterbore while the second keeper feature may be a lip.

In yet another illustrative example, neither outer sleeve 214 nor inner sleeve 216 have a keeper feature. In this illustrative example, inner sleeve 216 may be retained within outer sleeve 214 by at least one structure selected from first part 202, second part 204, and any other suitable structure. This illustrative example may reduce the height of assembly 206 relative to assembly 206 having keeper feature 222. Designing assembly 206 without keeper feature 222 could also reduce the cost and weight of assembly 206.

Figure 3:
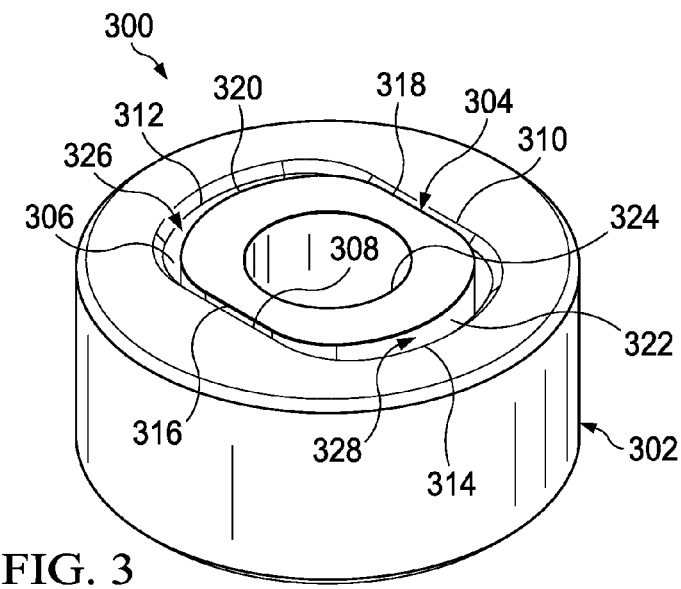
FIG. 3 is an illustration of a perspective view of an assembly in accordance with an illustrative embodiment.

With reference now to FIG. 3, an illustration of a perspective view of an assembly is depicted in accordance with an illustrative embodiment. As depicted, assembly 300 is an example of a physical implementation of assembly 206 shown in block form in FIG. 2.

As depicted, assembly 300 has outer sleeve 302 and inner sleeve 304. Inner sleeve 304 is configured to fit within first channel 306 of outer sleeve 302.

First channel 306 has first substantially planar surface 308, second substantially planar surface 310, first curved surface 312, and second curved surface 314. As depicted first substantially planar surface 308 and second substantially planar surface 310 are parallel to each other.

Inner sleeve 304 has third substantially planar surface 316, fourth substantially planar surface 318, third curved surface 320, and fourth curved surface 322. As depicted, third substantially planar surface 316 of inner sleeve 304 is configured to engage first substantially planar surface 308 of outer sleeve 302. As depicted, fourth substantially planar surface 318 of inner sleeve 304 is configured to engage second substantially planar surface 310 of outer sleeve 302. In one illustrative embodiment, third substantially planar surface 316 and fourth substantially planar surface 318 of inner sleeve 304 are configured to slideably engage first substantially planar surface 308 and second substantially planar surface 310 of outer sleeve 302 respectively.

As depicted, first curved surface 312 and third curved surface 320 have complementary curvatures. In other words, first curved surface 312 of outer sleeve 302 is configured to engage third curved surface 320 of inner sleeve 304. Likewise, second curved surface 314 and fourth curved surface 322 have complementary curvatures.

First curved surface 312 and third curved surface 320 are separated by distance 326. Second curved surface 314 and fourth curved surface 322 are separated by distance 328. As inner sleeve 304 moves within first channel 306, distance 326 and distance 328 may increase or decrease. For instance, in one illustrative example, inner sleeve 304 may move within first channel 306 so that first curved surface 312 engages third curved surface 320. In this illustrative example, distance 326 is decreased to zero and distance 328 is increased.

Inner sleeve 304 is configured to move within outer sleeve 302. In one illustrative example, inner sleeve 304 may be configured to move along a single axis. In this illustrative example, the single axis may be parallel to at least one of first substantially planar surface 308, second substantially planar surface 310, third substantially planar surface 316 and fourth substantially planar surface 318. This movement may be referred to as translation movement. In some illustrative examples, inner sleeve 304 may be configured to move along two axes. In illustrative examples in which inner sleeve 304 is configured to move along two axes, assembly 300 may accommodate orientation variation between holes in parts in addition to distance variations in the holes. In one illustrative example, one of the two axes may be perpendicular to at least one of first substantially planar surface 308, second substantially planar surface 310, third substantially planar surface 316 and fourth substantially planar surface 318. In these illustrative examples, this movement may be referred to as rotation movement.

In one illustrative example, inner sleeve may rotatably move about an axis perpendicular to at least one of first substantially planar surface 308, second substantially planar surface 310, third substantially planar surface 316 and fourth substantially planar surface 318 separate from movement along a first axis. In another illustrative example, inner sleeve may rotatably move about an axis perpendicular to at least one of first substantially planar surface 308, second substantially planar surface 310, third substantially planar surface 316 and fourth substantially planar surface 318 simultaneously with regard to movement along a first axis.

Inner sleeve 304 also has second channel 324. Second channel 324 is configured to receive an elongate structure.

The illustration in FIG. 3 is only an example of a physical implementation for assembly 206 shown in block form in FIG. 2 and is not meant to limit the manner in which assembly 206 may be implemented. For example, although inner sleeve 304 is described as moving along one axis or two axes within first channel 306, in some illustrative examples, inner sleeve 304 may be configured to allow movement along three axes and in six degrees of freedom.

Figure 4:
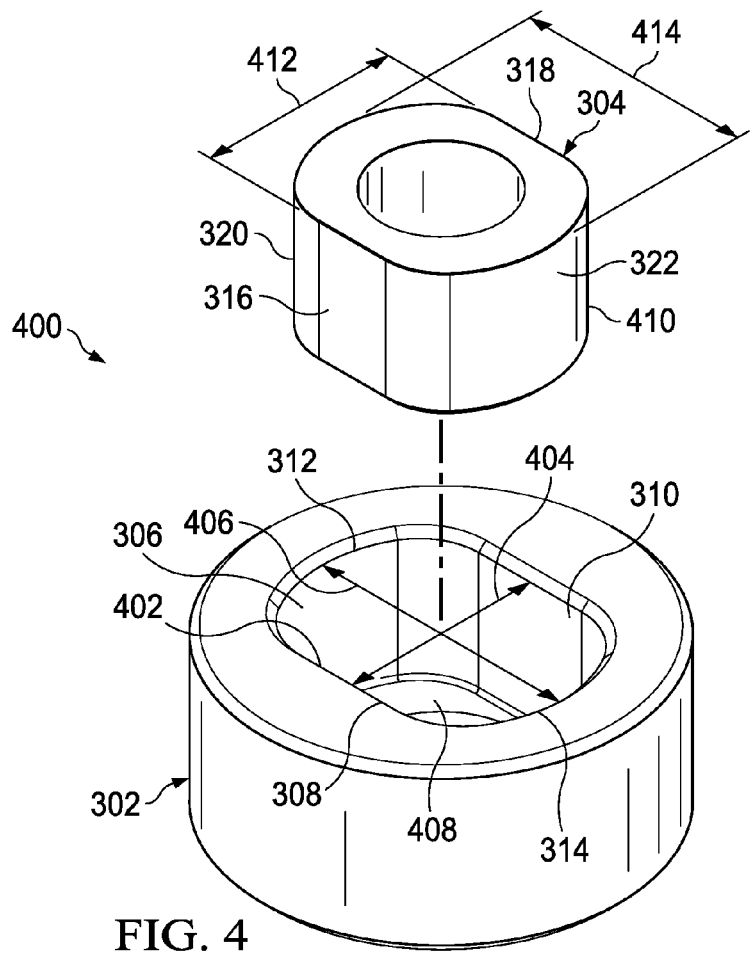
FIG. 4 is an illustration of an exploded view of an assembly in accordance with an illustrative embodiment.

With reference now to FIG. 4, an illustration of an exploded view of an assembly is depicted in accordance with an illustrative embodiment. As depicted, assembly 400 is an example of a physical implementation of assembly 206 shown in block form in FIG. 2, and an exploded view of assembly 300 of FIG. 3.

As depicted, assembly 400 has outer sleeve 302 and inner sleeve 304. Outer sleeve 302 has first channel 306. First channel 306 has inner wall 402 which has first substantially planar surface 308, second substantially planar surface 310, first curved surface 312, and second curved surface 314.

First channel 306 also has first diameter 404 and second diameter 406. As depicted, first diameter 404 is the distance from first substantially planar surface 308 to second substantially planar surface 310. First diameter 404 is configured to receive inner sleeve 304. Second diameter 406 is the distance from the center of first curved surface 312 to the center of second curved surface 314. Second diameter 406 is configured to allow inner sleeve 304 to move within first channel 306.

Outer sleeve 302 also has keeper feature 408. Keeper feature 408 is configured to retain inner sleeve 304 in one direction. As depicted, keeper feature 408 is a lip.

Inner sleeve 304 has outer wall 410 which has third substantially planar surface 316, fourth substantially planar surface 318, third curved surface 320, and fourth curved surface 322. Outer wall 410 is configured to fit into first channel 306 of outer sleeve 302.

Inner sleeve 304 also has third diameter 412 and fourth diameter 414. As depicted, third diameter 412 is the distance between third substantially planar surface 316 and fourth substantially planar surface 318. Third diameter 412 is configured to fit within first diameter 404. In one illustrative example, third diameter 412 is configured so that inner sleeve 304 is slideably engageable with outer sleeve 302. In this illustrative example, third substantially planar surface 316 and fourth substantially planar surface 318 are slideably engageable with first substantially planar surface 308 and second substantially planar surface 310 respectively.

Fourth diameter 414 is configured to fit within second diameter 406. As depicted, fourth diameter 414 is the distance from the center of third curved surface 320 to the center of fourth curved surface 322. As depicted, fourth diameter 414 is shorter than second diameter 406 so that inner sleeve 304 may move within outer sleeve 302 along a first axis parallel to first substantially planar surface 308 and second substantially planar surface 310.

Figure 5:
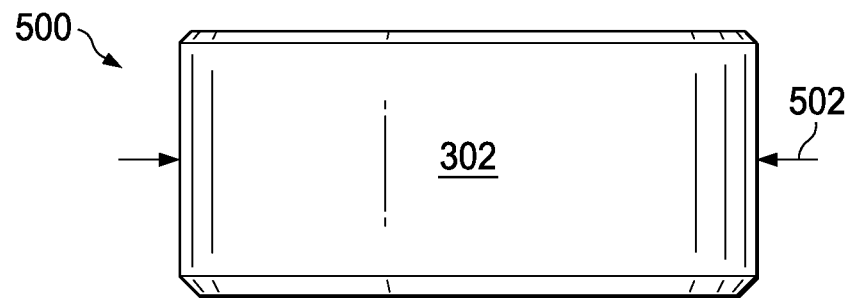
FIG. 5 is an illustration of a side view of an assembly in accordance with an illustrative embodiment.

With reference now to FIG. 5, an illustration of a side view of an assembly is depicted in accordance with an illustrative embodiment. As depicted, assembly 500 is an example of a physical implementation of assembly 206 shown in block form in FIG. 2, and a side view of assembly 300 of FIG. 3.

Assembly 500 has outer sleeve 302. Outer sleeve 302 has outer diameter 502. Outer diameter 502 is configured to fit within a hole in a part. In one illustrative example, outer diameter 502 is configured to be a transition fit in a hole within a part. In one illustrative example, the hole is a counterbore connected to a hole in the part configured to receive an elongate structure.

Figure 6:
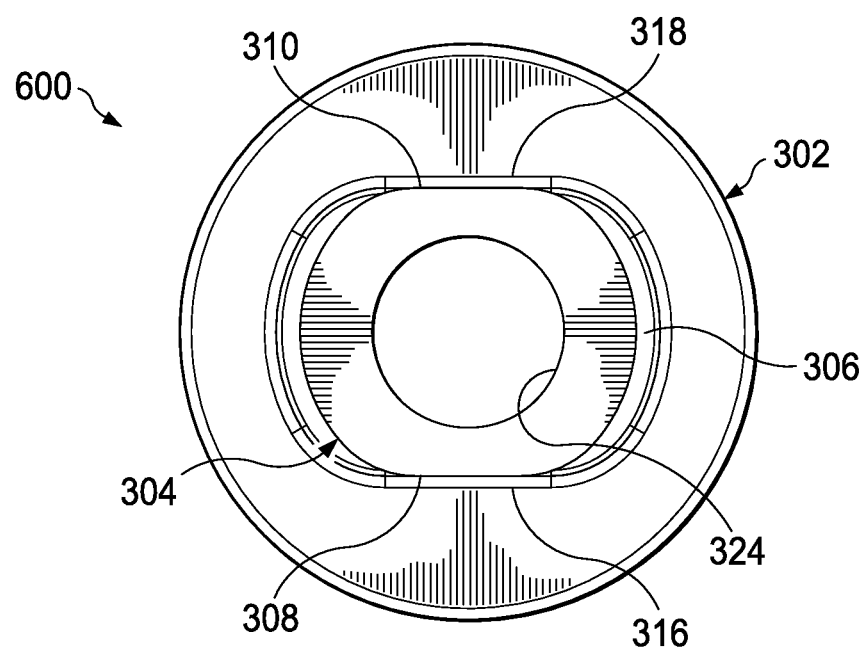
FIG. 6 is an illustration of a front view of an assembly in accordance with an illustrative embodiment.

With reference now to FIG. 6, an illustration of a front view of an assembly is depicted in accordance with an illustrative embodiment. As depicted, assembly 600 is an example of a physical implementation of assembly 206 shown in block form in FIG. 2, and a front view of assembly 300 of FIG. 3.

Assembly 600 comprises outer sleeve 302 and inner sleeve 304. As depicted, inner sleeve 304 is positioned within first channel 306 of outer sleeve 302.

As depicted, outer sleeve 302 has first substantially planar surface 308 and second substantially planar surface 310. Inner sleeve 304 has third substantially planar surface 316 and fourth substantially planar surface 318.

In one illustrative example, assembly 600 may be used to join a first part to a second part. In this illustrative example, assembly 600 may be placed in a hole of the first part. Assembly 600 may be oriented in relation to the first part using an orientation feature of outer sleeve 302.

An elongate structure may then be placed through a hole of the second part and through second channel 324 of inner sleeve 304. While the first part and the second part are joined, external forces may be applied to the parts. These external forces may encourage the first part and the second part to shift relative to each other. This may cause shear forces to be applied to the elongate structure while elongate structure is within second channel 324.

Assembly 600 may effectively transfer shear forces from the elongate structure to the first part. In this illustrative example, the elongate structure may transfer the shear forces into inner sleeve 304 through the walls of second channel 324. In an illustrative example, second channel 324 may be configured to transition fit the elongate structure to effectively transmit high forces.

Next, inner sleeve 304 transfers the shear forces into outer sleeve 302. Inner sleeve 304 may transfer forces through at least one of third substantially planar surface 316 and fourth substantially planar surface 318. For example, inner sleeve 304 may transfer forces through third substantially planar surface 316 into first substantially planar surface 308. As third substantially planar surface 316 and first substantially planar surface 308 are parallel to each other, force may be transferred across the length of third substantially planar surface 316. The area transferring a force may be referred to as a load path. The load path created by third substantially planar surface 316 and first substantially planar surface 308 can carry high forces due to the large surface area of the load path.

Although in this illustrative example the forces are described as being transferred through third substantially planar surface 316 and first substantially planar surface 308, in other illustrative examples the forces may instead transfer through fourth substantially planar surface 318 and second substantially planar surface 310. In other illustrative examples, forces may be transferred through third substantially planar surface 316 and fourth substantially planar surface 318 to first substantially planar surface 308 and second substantially planar surface 310 respectively.

Figure 7:
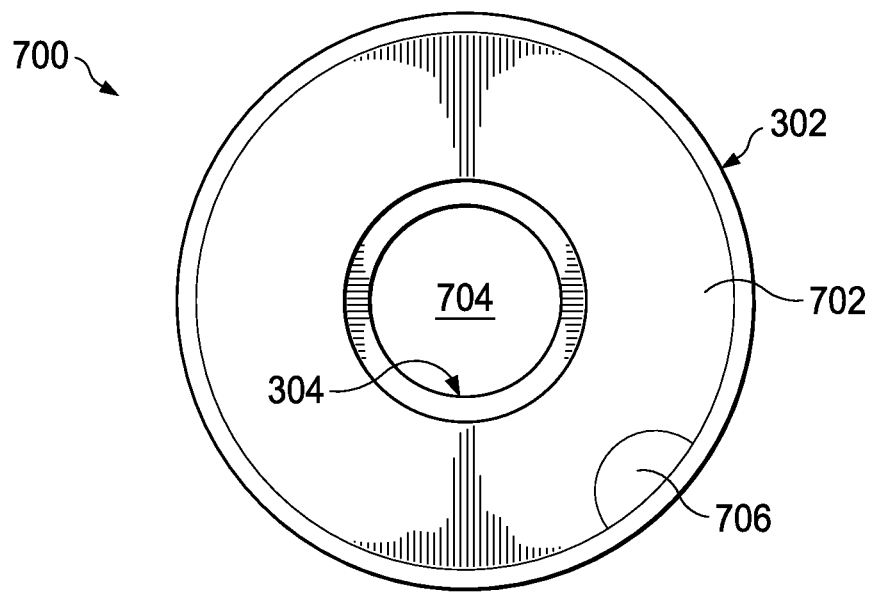
FIG. 7 is an illustration of a back view of an assembly in accordance with an illustrative embodiment.

With reference now to FIG. 7, an illustration of a back view of an assembly is depicted in accordance with an illustrative embodiment. As depicted, assembly 700 is an example of a physical implementation of assembly 206 shown in block form in FIG. 2, and a back view of assembly 300 of FIG. 3.

Assembly 700 comprises outer sleeve 302 and inner sleeve 304. Outer sleeve 302 has keeper feature 702, opening 704, and orientation feature 706. As depicted, keeper feature 702 is a lip. Keeper feature 702 retains inner sleeve 304 within outer sleeve 302 in one direction.

Opening 704 is configured to receive an elongate structure. Further, opening 704 may be configured to allow an elongate structure to move within opening 704 as inner sleeve 304 moves within outer sleeve 302.

As depicted, orientation feature 706 is a groove. Orientation feature 706 may be configured to accept a portion of a head of a fastener. In one illustrative example, the head of a screw engages outer sleeve 302 within orientation feature 706. Orientation feature 706 is configured to prevent rotation of outer sleeve 302 relative to a part.

Figure 8:
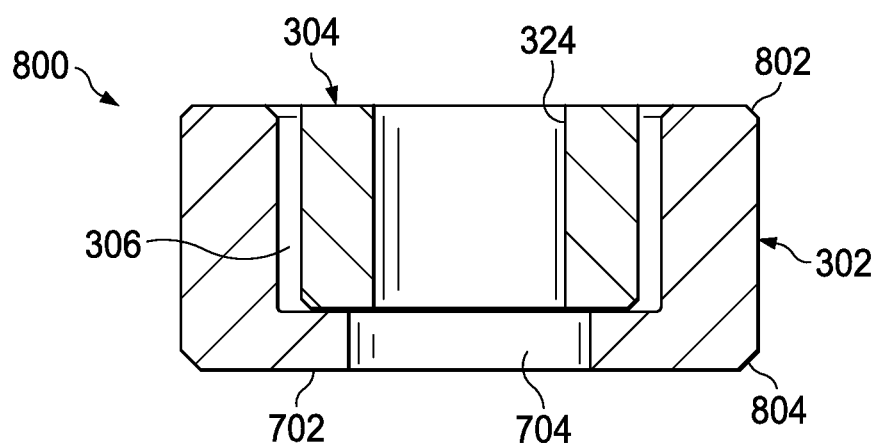
FIG. 8 is an illustration of a cross-section of an assembly in accordance with an illustrative embodiment.

With reference now to FIG. 8, an illustration of a cross-section of an assembly is depicted in accordance with an illustrative embodiment. As depicted, assembly 800 is an example of a physical implementation of assembly 206 shown in block form in FIG. 2, and a cross-section view of assembly 300 of FIG. 3.

Assembly 800 comprises outer sleeve 302 and inner sleeve 304. Inner sleeve 304 is configured to slideably engage outer sleeve 302.

Outer sleeve has first channel 306, keeper feature 702, and opening 704. Inner sleeve 304 is configured to fit within first channel 306. Keeper feature 702 is configured to retain inner sleeve 304 within first channel 306 in one direction. Opening 704 is configured to receive an elongate member and allow movement of elongate member within opening 704 in the axis of movement of inner sleeve within outer sleeve 302. As a result, opening 704 is larger in diameter than second channel 324 of inner sleeve 304. Outer sleeve 302 also has beveled edge 802 and beveled edge 804. Beveled edge 802 and beveled edge 804 may allow for outer sleeve 302 to fit within holes which are not perfectly cylindrical. In other words, beveled edge 802 and beveled edge 804 may allow outer sleeve 302 to fit into holes with rounded corners. A hole with rounded corners may have a radius rather than a 90 degree angle at the intersection of the walls and base of the hole.

Figure 9:
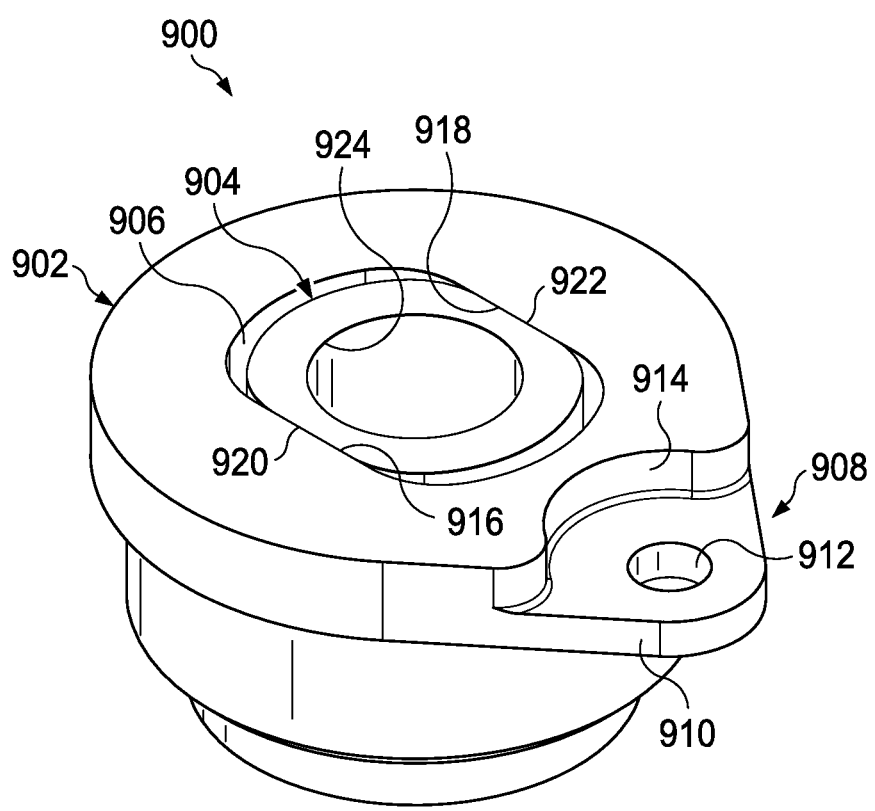
FIG. 9 is an illustration of a perspective view of an assembly in accordance with an illustrative embodiment.

With reference to FIG. 9, an illustration of a perspective view of an assembly is depicted in accordance with an illustrative embodiment. As depicted assembly 900 is an example of a physical implementation of assembly 206 shown in block form in FIG. 2. Assembly 900 has outer sleeve 902 and inner sleeve 904. As depicted, outer sleeve 902 has first channel 906 and orientation feature 908. First channel 906 is configured to receive portions of inner sleeve 904. First channel 906 has first substantially planar surface 916 and second substantially planar surface 918. Inner sleeve 904 has third substantially planar surface 920 and fourth substantially planar surface 922. First substantially planar surface 916 and third substantially planar surface 920 are configured to slideably engage. Likewise, second substantially planar surface 918 and fourth substantially planar surface 922 are configured to slideably engage.

Orientation feature 908 has flange 910, hole 912, and groove 914. Hole 912 is configured to receive a fastener. Flange 910 is configured to sit between the fastener and a part. Groove 914 is configured to receive a portion of the head of a fastener.

To orient assembly 900 with regard to a part, a fastener is placed through hole 912. The fastener is also placed into a hole in the part. As a result, the fastener orients outer sleeve 902 in a position relative to the part.

Inner sleeve 904 has second channel 924. Second channel 924 is configured to receive an elongate structure. In one illustrative example, second channel 924 is configured to be a transition fit with an elongate structure.

Figure 10:
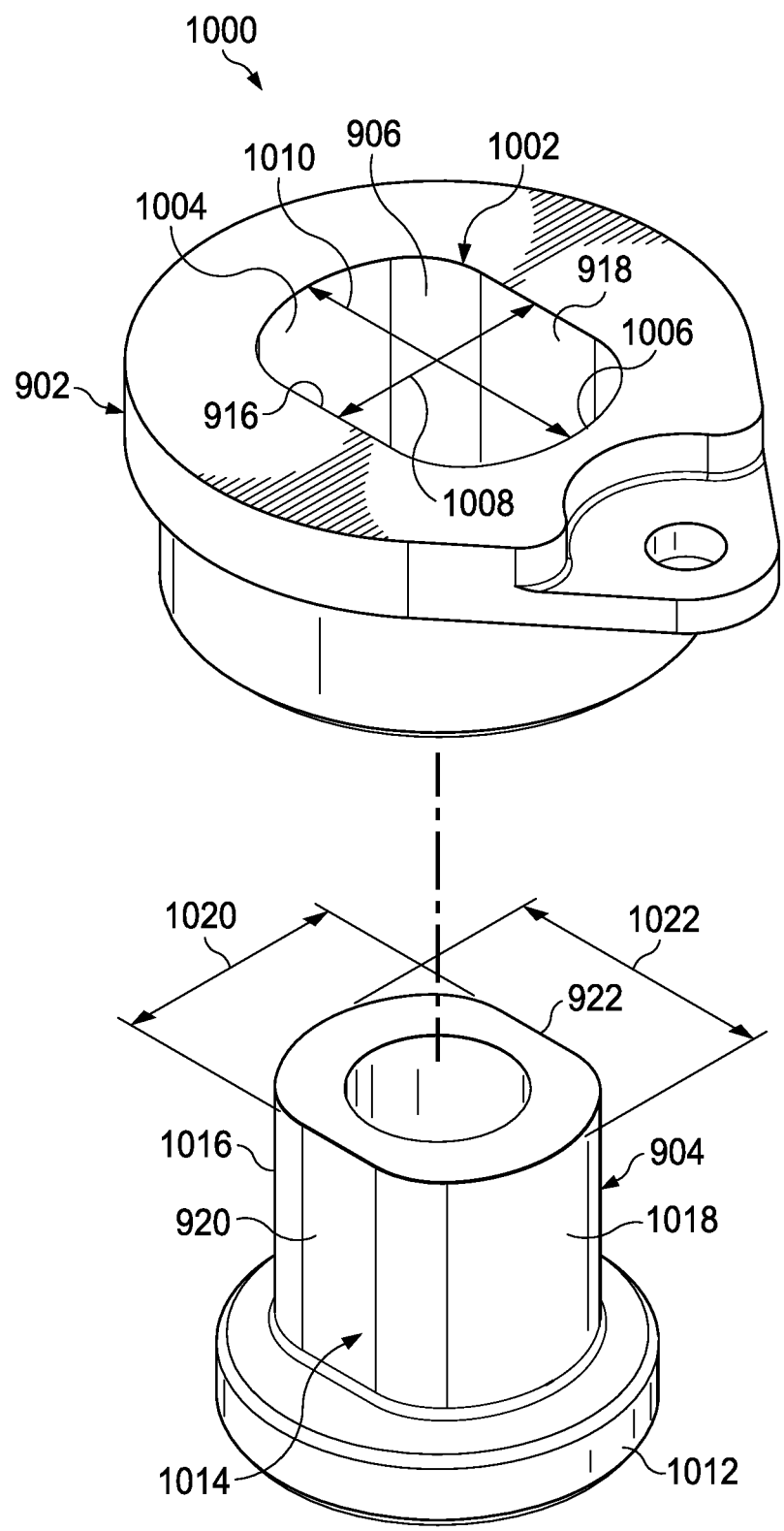
FIG. 10 is an illustration of an exploded view of an assembly in accordance with an illustrative embodiment.

With reference to FIG. 10, an illustration of an exploded view of an assembly is depicted in accordance with an illustrative embodiment. As depicted, assembly 1000 is an example of a physical implementation of assembly 206 shown in block form in FIG. 2, and an exploded view of assembly 900 of FIG. 9.

Assembly 1000 comprises outer sleeve 902 and inner sleeve 904. Outer sleeve 902 has first channel 906. First channel 906 has inner wall 1002 which has first substantially planar surface 916, second substantially planar surface 918, first curved surface 1004, and second curved surface 1006.

First channel 906 also has first diameter 1008 and second diameter 1010. As depicted, first diameter 1008 is the distance from first substantially planar surface 916 to second substantially planar surface 918. First diameter 1008 is configured to receive inner sleeve 904. Second diameter 1010 is the distance from the center of first curved surface 1004 to the center of second curved surface 1006. Second diameter 1010 is configured to allow inner sleeve 904 to move within first channel 906.

Inner sleeve 904 has keeper feature 1012 and outer wall 1014. Keeper feature 1012 is on a first side of inner sleeve 904, opposite the outer sleeve 902, and retains inner sleeve 904 within outer sleeve 902 in a first direction. As depicted, keeper feature 1012 is a lip.

In some illustrative examples, at least a portion of assembly 900 may be inserted into a structure such as first part 202 or second part 204 of FIG. 2. In these illustrative examples, inner sleeve 904 may be retained within outer sleeve 902 in a second direction, opposite to the first direction by the structure. One illustrative example of this relationship may be seen in FIG. 17 below.

Outer wall 1014 has third substantially planar surface 920, fourth substantially planar surface 922, third curved surface 1016, and fourth curved surface 1018. Outer wall 1014 is configured to fit into first channel 906 of outer sleeve 902.

Inner sleeve 904 also has third diameter 1020 and fourth diameter 1022. As depicted, third diameter 1020 is the distance between third substantially planar surface 920 and fourth substantially planar surface 922. Third diameter 1020 is configured to fit within first diameter 1008. In one illustrative example, third diameter 1020 is configured so that inner sleeve 904 is slideably engageable with outer sleeve 902. In this illustrative example, third substantially planar surface 920 and fourth substantially planar surface 922 are slideably engageable with first substantially planar surface 916 and second substantially planar surface 918 respectively.

Fourth diameter 1022 is configured to fit within second diameter 1010. As depicted, fourth diameter 1022 is the distance from the center of third curved surface 1016 to the center of fourth curved surface 1018. As depicted, fourth diameter 1022 is shorter than second diameter 1010 so that inner sleeve 904 may move within outer sleeve 902 along a single axis.

Figure 11:
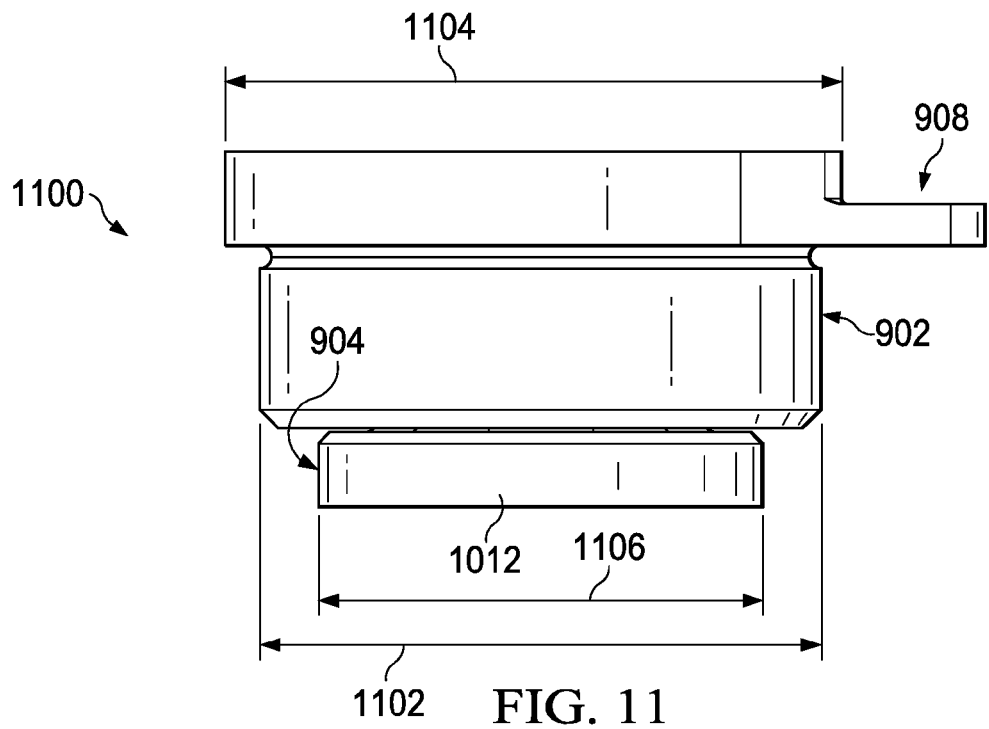
FIG. 11 is an illustration of a side view of an assembly in accordance with an illustrative embodiment.

With reference to FIG. 11, an illustration of a side view of an assembly is depicted in accordance with an illustrative embodiment. As depicted, assembly 1100 is an example of a physical implementation of assembly 206 shown in block form in FIG. 2, and a side view of assembly 900 of FIG. 9.

Assembly 1100 comprises outer sleeve 902 and inner sleeve 904. Outer sleeve 902 has outer diameter 1102, upper diameter 1104, and orientation feature 908. Outer diameter 1102 is configured to fit within a hole of a part. In one illustrative example, outer diameter 1102 is configured to be a transition fit in a hole within a part. In one illustrative example, the hole is a counterbore connected to a hole in the part configured to receive an elongate structure.

Upper diameter 1104 is configured to be greater than outer diameter 1102. As a result, only a portion of outer sleeve 902 resides within the hole in the part. This provides sufficient vertical space for inner sleeve 904 to move within outer sleeve 902 and within the hole. This may prevent outer sleeve 902 from placing an undesirable amount of pressure on inner sleeve 904. If an undesirable amount of pressure is placed onto inner sleeve 904, inner sleeve 904 might not be able to move.

Inner sleeve 904 has keeper feature 1012 which has diameter 1106. As depicted, diameter 1106 is smaller than outer diameter 1102. As diameter 1106 is smaller than outer diameter 1102, inner sleeve 904 may move within a hole holding outer sleeve 902. Diameter 1106 is larger than a first channel through outer sleeve 902. As diameter 1106 is larger than a first channel through outer sleeve 902, inner sleeve 904 is retained within outer sleeve 902 in one direction.

Figure 12:
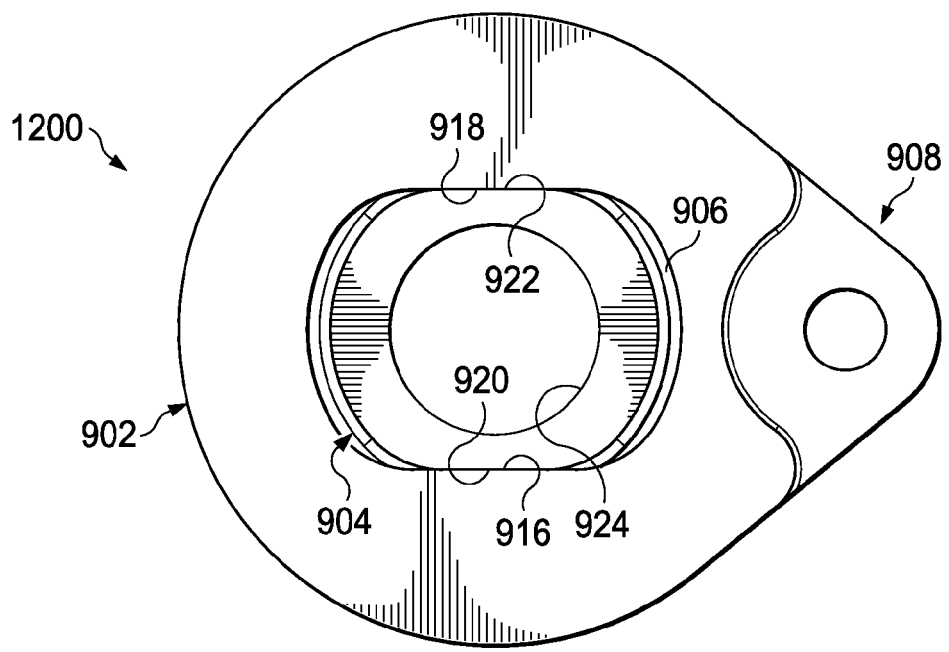
FIG. 12 is an illustration of a front view of an assembly in accordance with an illustrative embodiment.

With reference to FIG. 12, an illustration of a front view of an assembly is depicted in accordance with an illustrative embodiment. As depicted, assembly 1200 is an example of a physical implementation of assembly 206 shown in block form in FIG. 2, and a front view of assembly 900 of FIG. 9.

Assembly 1200 comprises outer sleeve 902 and inner sleeve 904. As depicted, inner sleeve 904 is positioned within first channel 906 of outer sleeve 902.

As depicted, outer sleeve 902 has first substantially planar surface 916 and second substantially planar surface 918. Inner sleeve 904 has third substantially planar surface 920, fourth substantially planar surface 922, and second channel 924.

In one illustrative example, assembly 1200 may be used to join a first part to a second part. In this illustrative example, assembly 1200 may be placed in a hole of the first part. Assembly 1200 may be oriented in relation to the first part using orientation feature 908 of outer sleeve 902.

An elongate structure may be placed through a hole of the second part and through second channel 924 of inner sleeve 904. While the first part and the second part are joined, external forces may be applied to the parts. These external forces may encourage the first part and the second part to shift relative to each other. This may cause shear forces to be applied to the elongate structure while elongate structure is within second channel 924.

Assembly 1200 may effectively transfer shear forces from the elongate structure to the first part. In this illustrative example, the elongate structure may transfer the shear forces into inner sleeve 904 through the walls of second channel 924. In an illustrative example, second channel 924 may be configured to transition fit the elongate structure to effectively transmit high forces.

Next, inner sleeve 904 transfers the shear forces into outer sleeve 902. Inner sleeve 904 may transfer forces through at least one of third substantially planar surface 920 and fourth substantially planar surface 922. For example, inner sleeve 904 may transfer forces through third substantially planar surface 920 into first substantially planar surface 916. As third substantially planar surface 920 and first substantially planar surface 916 are parallel to each other, force may be transferred across the length of third substantially planar surface 920. The area transferring force may be referred to as a load path. The load path created by third substantially planar surface 920 and first substantially planar surface 916 can carry high forces due to the large surface area of the load path.

Although in this illustrative example the forces are described as being transferred through third substantially planar surface 920 and first substantially planar surface 916, in other illustrative examples the forces may instead transfer through fourth substantially planar surface 922 and second substantially planar surface 918. In other illustrative examples, forces may be transferred through third substantially planar surface 920 and fourth substantially planar surface 922 to first substantially planar surface 916 and second substantially planar surface 918 respectively.

Figure 13:
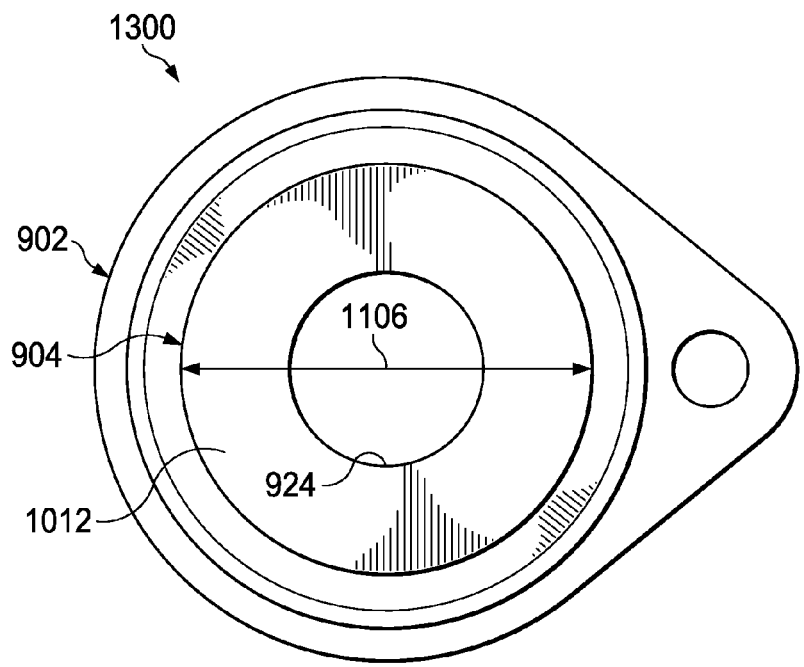
FIG. 13 is an illustration of a back view of an assembly in accordance with an illustrative embodiment.

With reference now to FIG. 13, an illustration of a back view of an assembly is depicted in accordance with an illustrative embodiment. As depicted, assembly 1200 is an example of a physical implementation of assembly 206 shown in block form in FIG. 2, and a back view of assembly 900 of FIG. 9.

Assembly 1300 has outer sleeve 902 and inner sleeve 904. As depicted, inner sleeve 904 resides within a first channel of outer sleeve 902. Inner sleeve 904 has keeper feature 1012 and second channel 924. Keeper feature 1012 is configured to retain inner sleeve 904 within the first channel of outer sleeve 902 in one direction. As depicted, keeper feature 1012 retains inner sleeve 904 by having diameter 1106. Diameter 1106 is larger than the first channel of outer sleeve 902.

Figure 14:
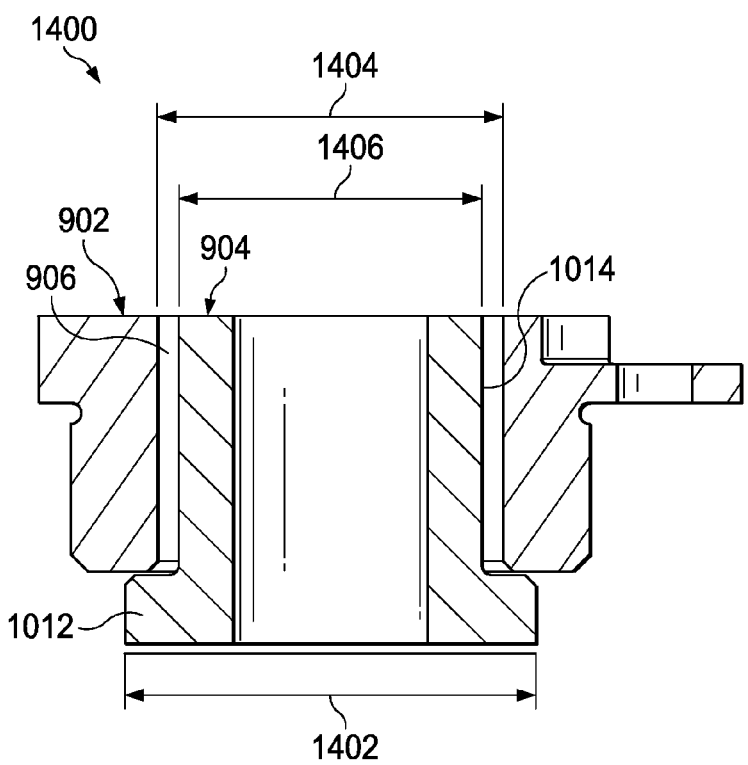
FIG. 14 is an illustration of a cross-section of an assembly in accordance with an illustrative embodiment.

With reference now to FIG. 14, an illustration of a cross-section of an assembly is depicted in accordance with an illustrative embodiment. As depicted assembly 1400 is an example of a physical implementation of assembly 206 shown in block form in FIG. 2, and a cross-section view of assembly 900 of FIG. 9.

Assembly 1400 has outer sleeve 902 and inner sleeve 904. Inner sleeve 904 is configured to fit within first channel 906 of outer sleeve 902. Inner sleeve 904 has keeper feature 1012 and outer wall 1014. As depicted, diameter 1402 of keeper feature 1012 is larger than second diameter 1404 of first channel 906. As a result, keeper feature 1012 retains inner sleeve 904 within outer sleeve 902 in one direction. In other words, keeper feature 1012 prevents inner sleeve 904 from moving all the way through first channel 906.

Outer wall 1014 has fourth diameter 1406. As depicted, fourth diameter 1406 is smaller than second diameter 1404 of first channel 906, allowing inner sleeve 904 to move in one direction within outer sleeve 902.

Figure 15:
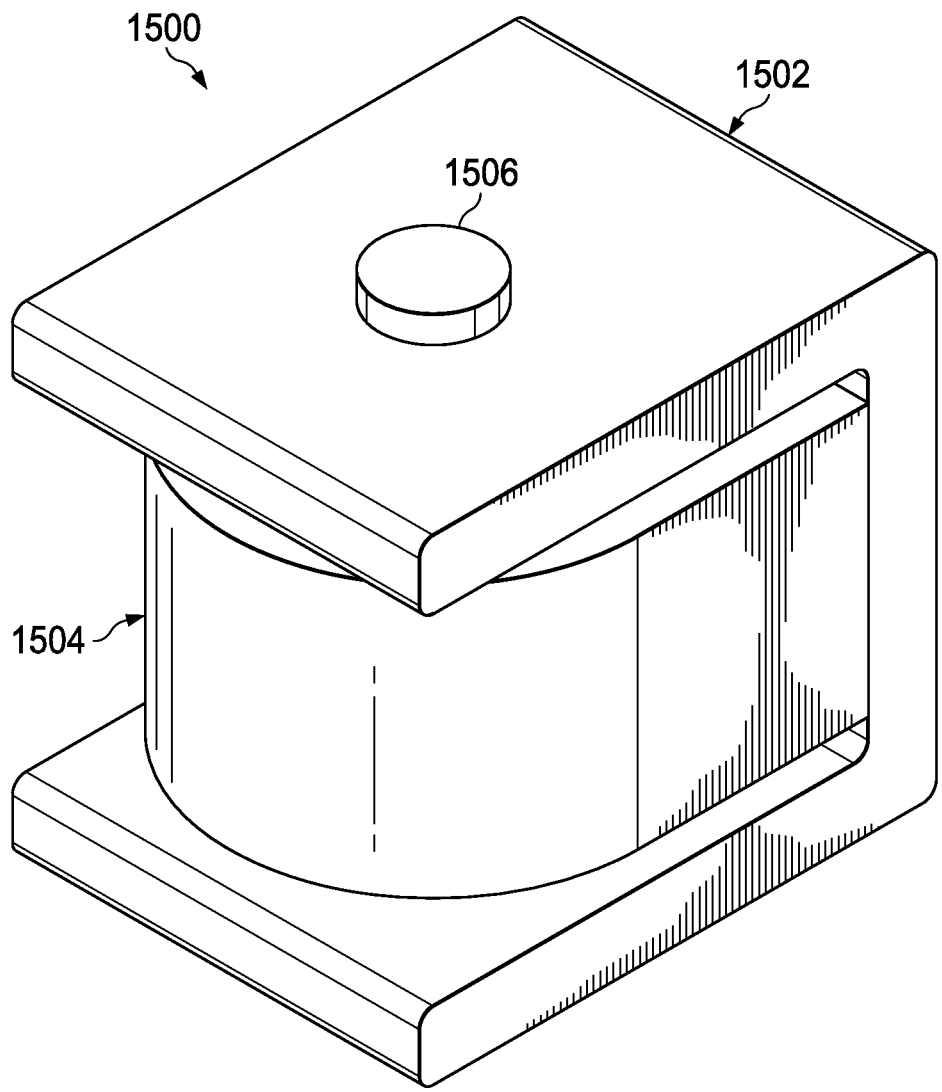
FIG. 15 is an illustration of a location of a platform in accordance with an illustrative embodiment.

With reference now to FIG. 15, an illustration of a location of a platform in which an illustrative embodiment may be implemented is depicted in accordance with an illustrative embodiment. Platform 1500 may be platform 200 of FIG. 2. Platform 1500 may be a portion of aircraft 100, such as a payload structure on the wing, body, wheel, or other suitable portion of aircraft 100.

Platform 1500 comprises first part 1502, second part 1504, and elongate structure 1506. As depicted, first part 1502 and second part 1504 are connected using elongate structure 1506.

Figure 16:
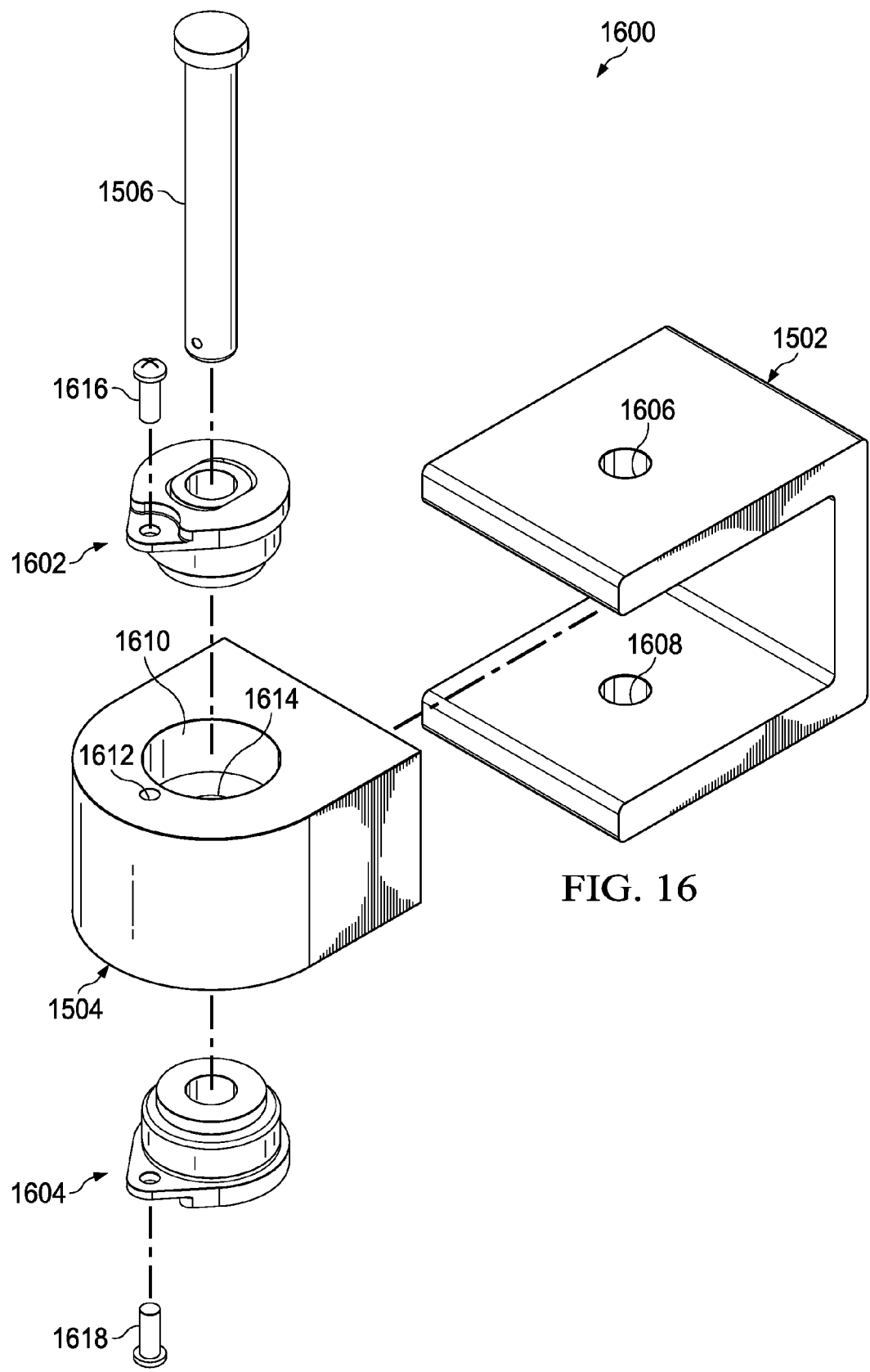
FIG. 16 is an illustration of an exploded view of a location of a platform in accordance with an illustrative embodiment.

With reference now to FIG. 16, an illustration of an exploded view of a location of a platform is depicted in accordance with an illustrative embodiment. Platform 1600 is an exploded view of platform 1500 of FIG. 15.

Platform 1600 comprises first part 1502, second part 1504, elongate structure 1506, first assembly 1602, and second assembly 1604. As depicted, first part 1502 has first hole 1606 and second hole 1608. First hole 1606 and second hole 1608 are configured to receive elongate structure 1506.

Second part 1504 has third hole 1614, first counterbore 1610, and first fastener hole 1612. Third hole 1614 is configured to receive elongate structure 1506. Third hole 1614 is configured to have sufficient clearance for elongate structure 1506 to move within third hole 1614.

First counterbore 1610 is configured to receive first assembly 1602. In one illustrative example, first counterbore 1610 is configured to be a transition fit with portions of first assembly 1602. A second counterbore is configured to receive second assembly 1604. In one illustrative example, the second counterbore is configured to be a transition fit with portions of second assembly 1604.

First assembly 1602 may be oriented in relation to second part 1504 using fastener 1616 and first fastener hole 1612. Specifically, fastener 1616 may be placed through an orientation feature of first assembly 1602 and first fastener hole 1612. As a result, first assembly 1602 is prevented from rotation within first counterbore 1610.

Second assembly 1604 may be oriented in relation to second part 1504 using fastener 1618 and a second fastener hole. Specifically, fastener 1618 may be placed through an orientation feature of second assembly 1604 and a second fastener hole. As a result, second assembly 1604 is prevented from rotation within a second counterbore.

Figure 17:
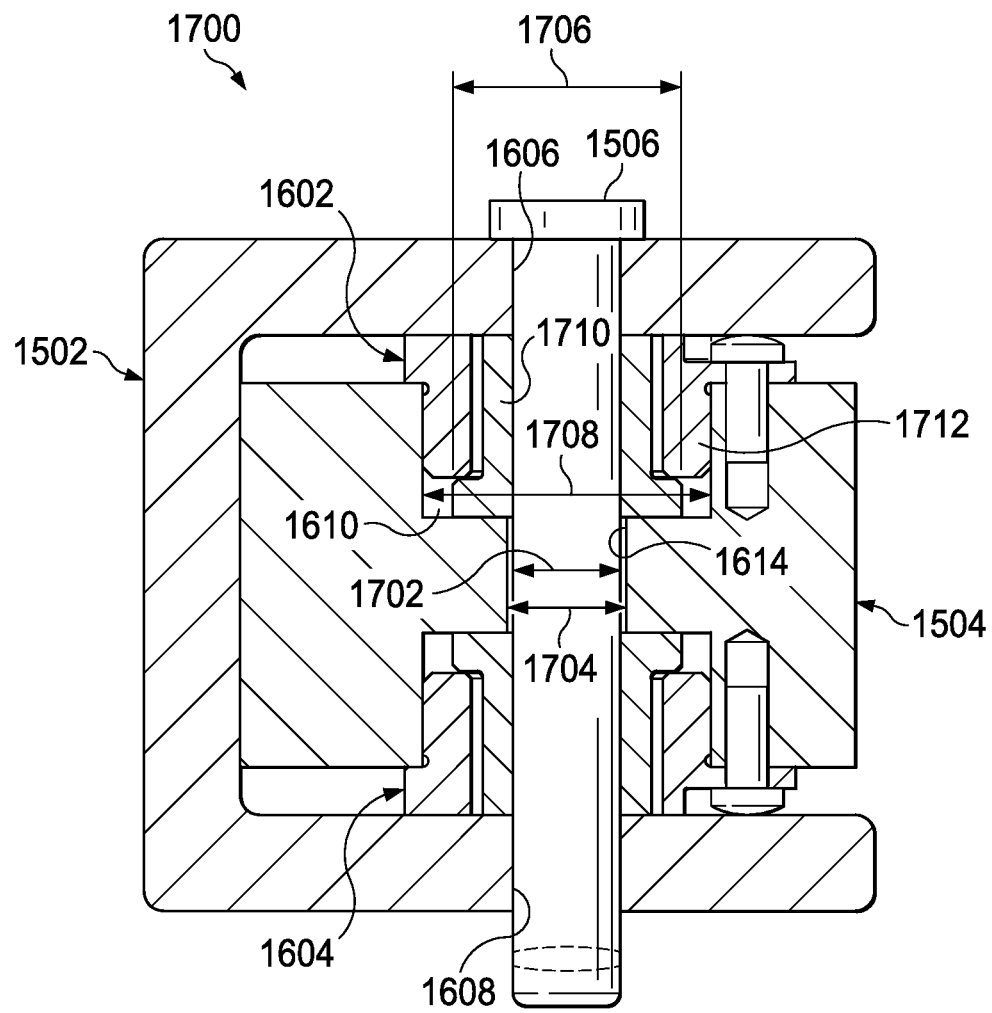
FIG. 17 is an illustration of a cross-sectional view of a location of a platform in accordance with an illustrative embodiment.

With reference now to FIG. 17, an illustration of a cross-sectional view of a location of a platform is depicted in accordance with an illustrative embodiment. Platform 1700 is a cross-sectional view of platform 1500 of FIG. 15.

Platform 1700 has first part 1502, second part 1504, elongate structure 1506, first assembly 1602, and second assembly 1604. First part 1502 may be a payload structure in aircraft 100 of FIG. 1. Second part 1504 may be a payload to be attached to the payload structure. Elongate structure 1506 passes through first hole 1606 of first part 1502, first assembly 1602, third hole 1614 of second part 1504, second assembly 1604, and second hole 1608 of first part 1502.

As depicted, elongate structure 1506 has shaft diameter 1702. Shaft diameter 1702 is smaller than diameter 1704 of third hole 1614 of second part 1504. As a result, third hole 1614 may allow movement of elongate structure 1506 within third hole 1614.

As depicted, lip diameter 1706 of first assembly 1602 is smaller than diameter 1708 of first counterbore 1610. As a result, inner sleeve 1710 of first assembly 1602 may move within first counterbore 1610.

The illustrations in FIGS. 3-17 are only examples of some physical implementations for assembly 206 shown in block form in FIG. 2 and not meant to limit the manner in which assembly 206 may be implemented. In one illustrative example, first part 1502 of FIG. 15 may instead only have a single hole to join first part 1502 to second part 1504 using elongate structure 1506. In another illustrative example, an assembly may be associated with first part 1502 rather than second part 1504. In one illustrative example, a single assembly, such as assembly 206, may be within a counterbore associated with first hole 1606 of first part 1502. In this illustrative example, conventionally known bushings may be used in second hole 1608 and third hole 1614.

In yet another illustrative example, platform 1600 in FIG. 16 may not have fastener 1616 and fastener 1618. In this illustrative example, first assembly 1602 and second assembly 1604 may be retained within second part 1504 by a structure selected from at least one of first part 1502 and any other suitable structure. First assembly 1602 and second assembly 1604 may be retained within second part 1504 by the same structure, or by different structures. This illustrative example may reduce the cost and weight of platform 1600 by potentially reducing the size of first assembly 1602 and second assembly 1604 and by eliminating fastener 1616 and fastener 1618. This illustrative example may also simplify the process of assembling platform 1600.

In other illustrative examples, platform 1700 may have larger clearances between at least one of first assembly 1602 and second assembly 1604 and at least one of first part 1502 and second part 1504 along the axis of elongate structure 1506. In one illustrative example, this larger clearance creates a space between a keeper feature of inner sleeve 1710 of first assembly 1602 and outer sleeve 1712 of first assembly 1602. In this illustrative example, there is also a space between first part 1502 and inner sleeve 1710 of first assembly 1602. As a result, in this illustrative example, inner sleeve 1710 may move in a rotation movement relative to outer sleeve 1712 of first assembly 1602. In another illustrative example, a number of additional structures, such as a spherical washer, may be used in platform 1600 to accommodate orientation differences between surfaces of inner sleeve 1710 and second part 1504.

The different components shown in FIG. 1 and FIGS. 3-16 may be combined with components in FIG. 2, used with components in FIG. 2, or a combination of the two. Additionally, some of the components in FIG. 1 and FIGS. 3-16 may be illustrative examples of how components shown in block form in FIG. 2 can be implemented as physical structures.

Figure 18:
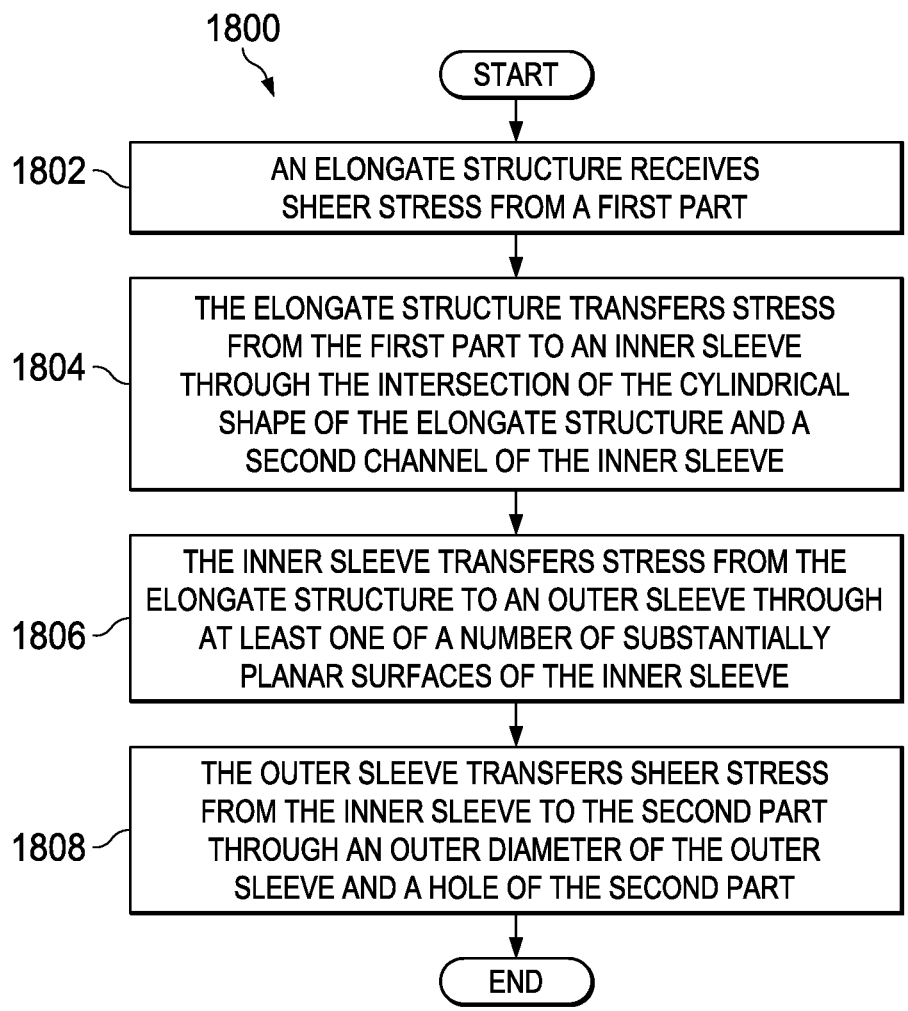
FIG. 18 is an illustration of a flowchart of a process for operating an assembly in accordance with an illustrative embodiment.

Turning now to FIG. 18, an illustration of a flowchart of a process for transfer of stress in an assembly is depicted in accordance with an illustrative embodiment. In this illustrative example, process 1800 in FIG. 18 may be implemented in platform 200 using assembly 206 in FIG. 2.

The process begins by an elongate structure receiving a shear stress from a first part (operation 1802). An elongate structure may receive a shear stress based on external forces working on at least one of the first part and a second part joined to the first part by the elongate structure. Such external forces may include wind, acceleration, deceleration, gravity, and other suitable forces.

Next, the elongate structure transfers stress from the first part to an inner sleeve through the intersection of the cylindrical shape of the elongate structure and a second channel of the inner sleeve (operation 1804). In one illustrative example, the second channel of the inner sleeve may be a transition fit to the elongate structure. In this illustrative example, the elongate structure may transfer high forces through the walls of the second channel.

Next, the inner sleeve transfers stress from the elongate structure to an outer sleeve through at least one of a number of substantially planar surfaces of the inner sleeve (operation 1806). In one illustrative example, the inner sleeve transfers stress from the elongate structure to at least one of a number of substantially planar surfaces of the outer sleeve. In this illustrative example, the at least one of a number of substantially planar surfaces of the inner sleeve and the at least one of a number of substantially planar surfaces of the outer sleeve are parallel to each other.

Last, the outer sleeve transfers shear stress from the inner sleeve to the second part through an outer diameter of the outer sleeve and a hole of the second part (operation 1808). The hole may be a counterbore or other type of hole in the second part. The outer sleeve is configured so that at least a portion of the outer sleeve may be received in the hole in the second part. In one illustrative example, at least a portion of the outer sleeve is configured to be transition fit with the hole in the second part.

The flowcharts and block diagrams in the different depicted embodiments illustrate the architecture, functionality, and operation of some possible implementations of the apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the assembly may instead transfer stresses from the second part to the first part through the elongate structure. In other words, the functions would be performed in the reverse order, with the outer sleeve transferring stress from the second part to the inner sleeve, and the inner sleeve transferring stress to the elongate structure.

Figure 19:
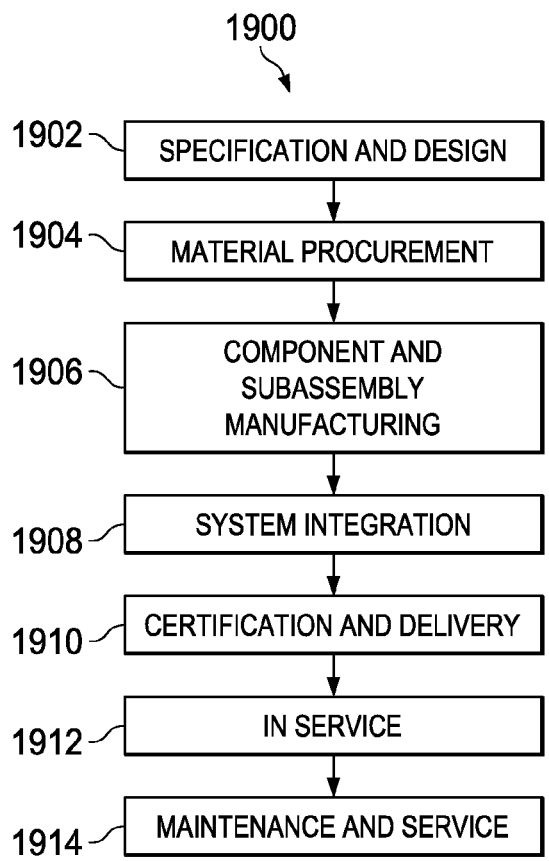
FIG. 19 is an illustration of an aircraft manufacturing and service method in accordance with an illustrative embodiment.
Figure 20:
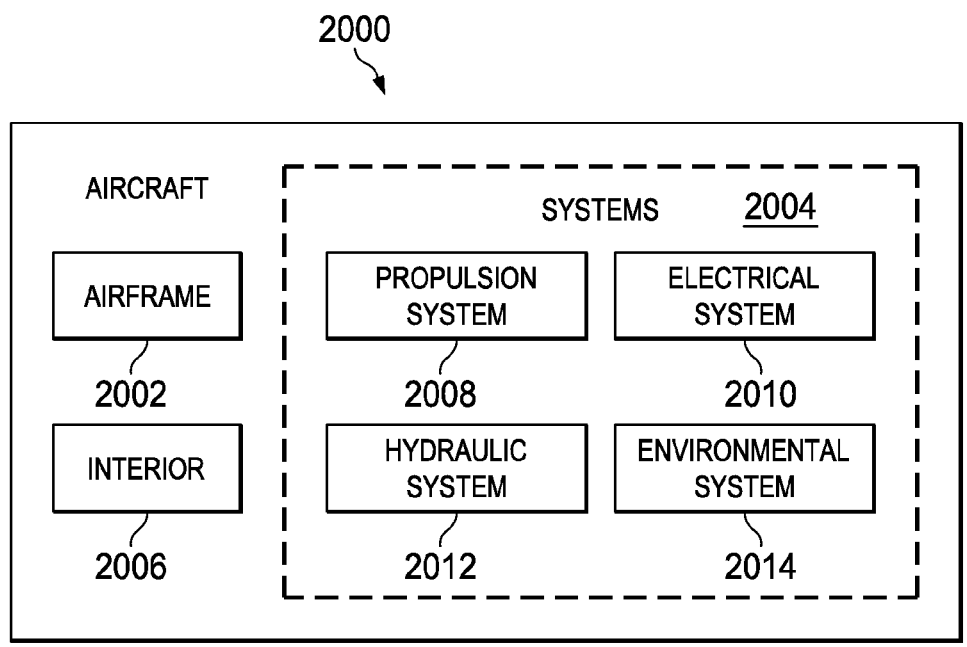
FIG. 20 is an illustration of an aircraft in the form of a block diagram in accordance with an illustrative embodiment.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 20, an illustration of an aircraft is depicted in accordance with an illustrative embodiment. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19. One or more illustrative embodiments may be used during component and subassembly manufacturing 1906. For example, assembly 206 in FIG. 2 may be used to join parts during component and subassembly manufacturing 1906. Further, assembly 206 may also be used to perform replacements during maintenance and service 1914. For example, aircraft 2000 may be inspected during scheduled maintenance for aircraft 2000.

The illustrative embodiments may be used to compensate for variations in the position of holes in parts. One or more illustrative embodiments may allow for high forces to be transferred from an elongate structure to an assembly. Further, the illustrative embodiments may be used in any type of part.

Further, the illustrative embodiments may produce a cost savings. For example, compensating for variations may enable the creation of simpler assembly designs. Simpler assembly designs may incorporate fewer separate major structural parts, which may produce a cost savings as well as a weight savings. Further, compensation for variations may result in cost savings by not having to scrap or rework parts that do not fit.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an outer sleeve having a first channel with an inner wall with a first number of substantially planar surfaces, the outer sleeve further having a first cylindrical lip on a first end of the outer sleeve, the first cylindrical lip having a first outer diameter greater than a second outer diameter of the outer sleeve; and
an inner sleeve having a second channel and an outer wall with a second number of substantially planar surfaces, wherein the outer wall is configured to be received within the first channel, and at least one of the second number of substantially planar surfaces on the outer wall of the inner sleeve is configured to slide against at least one of the first number of substantially planar surfaces, the inner sleeve further having a second cylindrical lip on a second end of the inner sleeve opposite the first cylindrical lip, the second cylindrical lip having a third outer diameter greater than a fourth outer diameter of the inner sleeve but less than the second outer diameter of the outer sleeve, the second cylindrical lip disposed on an outer surface of a third end of the outer sleeve that is opposite the first end.

2. The apparatus of claim 1, wherein the second channel is configured to receive an elongate structure.

3. The apparatus of claim 2, wherein the second channel is configured to be a transition fit with the elongate structure.

4. The apparatus of claim 2, wherein the inner sleeve is configured to transmit shear forces from the elongate structure through the at least one of the second number of substantially planar surfaces.

5. The apparatus of claim 1, wherein the inner sleeve is configured to slideably move within the first channel along a first axis.

6. The apparatus of claim 1, wherein the outer sleeve further comprises an orientation feature configured to orient the outer sleeve in relation to a structure.

7. The apparatus of claim 1, wherein the outer sleeve further comprises a securing feature configured to secure the outer sleeve to a structure.

8. The apparatus of claim 7, wherein the securing feature comprises a flange including a third channel for receiving a bolt.

9. The apparatus of claim 8, wherein the flange has a depressed profile relative to the first cylindrical lip.

10. The apparatus of claim 9, wherein the flange extends beyond the first outer diameter.

11. The apparatus of claim 1, wherein the outer sleeve has an outer diameter configured to be a transition fit with a hole in a structure.

12. The apparatus of claim 1, wherein at least one of the inner sleeve and the outer sleeve comprises hardened steel.

13. The apparatus of claim 1, wherein the inner sleeve and the outer sleeve comprise at least one of a plastic, a metal, a ceramic, and a composite.

14. The apparatus of claim 1, wherein the inner sleeve and the outer sleeve are made from different materials.

15. A system comprising:
a first part;
a second part;
an elongate structure connecting the first part and the second part; and an apparatus positioned in one of the first part and the second part, wherein the elongate structure is inserted through the apparatus, the apparatus comprising:

an outer sleeve having a first channel with an inner wall with a first number of substantially planar surfaces, the outer sleeve further having a first cylindrical lip on a first end of the outer sleeve, the first cylindrical lip having a first outer diameter greater than a second outer diameter of the outer sleeve; and an inner sleeve having a second channel and an outer wall with a second number of substantially planar surfaces, wherein the outer wall is configured to be received within the first channel, and at least one of the second number of substantially planar surfaces on the outer wall of the inner sleeve is configured to slide against at least one of the first number of substantially planar surfaces, the inner sleeve further having a second cylindrical lip on a second end of the inner sleeve opposite the first cylindrical lip, the second cylindrical lip having a third outer diameter greater than a fourth outer diameter of the inner sleeve but less than the second outer diameter of the outer sleeve, the second cylindrical lip disposed on an outer surface of a third end of the outer sleeve that is opposite the first end.

16. The system of claim 15, wherein the first part is a payload structure and the second part is a payload.

17. The system of claim 15, wherein the inner sleeve is configured to transmit shear forces from the elongate structure through the at least one of the second number of substantially planar surfaces.

18. The system of claim 15, wherein the system is selected from at least one of an aircraft, a surface ship, a tank, a personnel carrier, a train, a spacecraft, a space station, a satellite, a submarine, an automobile, a power plant, a bridge, a dam, a house, a manufacturing facility, and a building.

* * * * *